(12) United States Patent
Lee et al.

(10) Patent No.: US 7,742,105 B2
(45) Date of Patent: Jun. 22, 2010

(54) ON SCREEN DISPLAY APPARATUS AND METHOD FOR DISPLAYING MENU THEREON

(75) Inventors: Jeong-yeon Lee, Euijeongbu-si (KR); Sang-hee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1179 days.

(21) Appl. No.: 11/342,573

(22) Filed: Jan. 31, 2006

(65) Prior Publication Data
US 2006/0202978 A1 Sep. 14, 2006

(30) Foreign Application Priority Data
Mar. 10, 2005 (KR) .................. 10-2005-0020099

(51) Int. Cl.
H04N 5/50 (2006.01)
H04N 5/445 (2006.01)

(52) U.S. Cl. ...................... 348/569; 348/564

(58) Field of Classification Search .............. 348/569, 348/563, 564, 589, 598–600; 725/40–43, 725/47; 345/204; H04N 5/50, 5/445, 9/74, H04N 9/76
See application file for complete search history.

(56) References Cited

U.S. PATENT DOCUMENTS 5,677,708 A 10/1997 Matthews, III et al.
6,151,059 A * 11/2000 Schein et al. ............... 348/563
6,266,098 B1 7/2001 Cove et al.
6,411,307 B1 6/2002 Rosin et al.
6,411,337 B2 6/2002 Cove et al.
6,879,350 B2 * 4/2005 Kwon et al. ................ 348/569
2002/0075415 A1 * 6/2002 Suh ........................... 348/734

FOREIGN PATENT DOCUMENTS

| CN | 1299214 A | 6/2001 |
| EP | 1463052 A1 | 9/2004 |
| EP | 1511040 A1 | 3/2005 |
| KR | 1999-0048640 A | 12/1999 |
| KR | 2001-0083928 A | 9/2001 |

* cited by examiner

Primary Examiner—Sherrie Hsia
(74) Attorney, Agent, or Firm—Sughrue Mion, PLLC

(57) ABSTRACT

An on screen display (OSD) apparatus and a method for displaying a menu on the OSD apparatus are provided. The ODS apparatus includes: a memory module which stores a system program and data for a first region, where the data for the first region includes a plurality of first menu items; a screen which displays the first region; an input device which generates signals for displaying the first region on the screen; and a controller which divides the first region into a first sub-region and a second sub-region by using the system program, upon receipt of signals from an input device, and which displays the first sub-region and the second sub-region at different heights on the screen.

15 Claims, 7 Drawing Sheets

ON SCREEN DISPLAY APPARATUS AND METHOD FOR DISPLAYING MENU THEREON

CROSS-REFERENCE TO RELATED APPLICATIONS

This application claims priority from Korean Patent Application No. 2005-20099 filed Mar. 10, 2005, in the Korean Intellectual Property Office, the disclosure of which is incorporated herein by reference.

BACKGROUND OF THE INVENTION

1. Field of the Invention

Apparatuses and methods consistent with the present invention relates to an On Screen Display (OSD) and, more particularly, to an OSD apparatus for displaying a menu for a user more effectively by giving the menu a structural change or an animation effect, and a method for displaying a menu on the OSD apparatus.

2. Description of the Related Art

An OSD apparatus is typically included in a video device having a screen and the OSD apparatus displays, on the screen, information needed to operate the video device on the screen. Video devices having the OSD apparatuses include television (TV) sets, video cassette recorders (VCRs), automated-teller machines (ATMs), computers, and the like. OSD apparatuses are widely used in TV sets. Hereinafter, a conventional method for displaying a menu on a conventional OSD apparatus will be described with respect to a TV set.

According to a menu display method of an OSD apparatus used in a conventional TV set, a main menu is displayed sequentially on the screen as a user manipulates an input device, such as a control panel and a remote control, to select a desired function from the menu. Typically, the main menu includes option items that can be selected in the TV set or items for controlling the functions of the TV set. When the user selects one of the main menu items by using a control panel or a remote control, a sub-menu of the selected main menu item is displayed on the screen.

According to the menu display method of this conventional OSD apparatus, when the user selects a main menu item, it is difficult to know what options are available for his or her choice or what function of the TV set he or she can control, based on this selection, because the main menu items are simply displayed in the form of text. Therefore, the user has to go over each of the main menu items one by one and move between the menu items several times to find and set up a finally desired option or a function.

Since the menu item to be selected is displayed together in the same menu structure with menu items to be not selected, the degree of concentration on the menu item to be selected can be degraded and this may annoy the user.

SUMMARY OF THE INVENTION

It is, therefore, an exemplary object of the present. invention to provide an OSD apparatus that can give a structural change or an animation effect to a displayed menu so that a user can select a desired menu item effectively, and a menu display method for the OSD apparatus.

In accordance with an exemplary aspect of the present invention, there is provided an OSD apparatus, including: a memory module which stores data for a first region and which stores a system program, where the data for the first region includes a plurality of first menu items; a screen which displays the first region; an input device which generates signals for displaying the first region on the screen; and a controller which divides the first region into a first sub-region and a second sub-region and which displays the first sub-region and the second sub-region at different heights on the screen.

When at least one of the plurality of first menu items is displayed in the first sub-region, the controller displays help information for the at least one first menu item on the screen.

Also, when at least of the plurality of first menu items is displayed in the first sub-region, the controller displays at least one sub-menu item for the at least one first menu item on the screen.

The controller moves the first menu items horizontally to the left or right on the screen upon receipt of move signals from an input device.

When at least one of the plurality of first menu items is displayed in the first sub-region, the controller gives animates the at least one first menu item and displays the animated first menu item on the screen.

In accordance with another exemplary aspect of the present invention, there is provided a menu display method for an OSD apparatus, the method including: storing a system program and data for a first region, where the date for the first region includes a plurality of first menu items; generating signals for displaying the first region on a screen; receiving signals form an input device; and dividing the first region into a first sub-region and a second sub-region by using the system program, upon receipt of the signals from the input device, and displaying the first sub-region and the second sub-region at different heights on a screen.

When at least one of the plurality of first menu items is displayed in the first sub-region, the method further includes: displaying help information for the at least one first menu item on the screen.

When at least one of the plurality of first menu items is displayed in the first sub-region, the method further includes displaying at least one sub-menu item for the at least one first menu item on the screen.

The method further includes: moving the first menu items horizontally to the left or right on the screen upon receipt of move signals for moving the menu items, after the first region is displayed.

Also, the method further includes: when at least one of the plurality of first menu items is displayed in the first sub-region, animating the at least one first menu item and displaying the animated first menu item on the screen.

BRIEF DESCRIPTION OF THE DRAWINGS

The above and/or other aspects of the present invention will become more apparent by the following detailed description of exemplary embodiments of the present invention with reference to the accompanying drawings, in which.

DETAILED DESCRIPTION OF THE PREFERRED EMBODIMENTS

Figure 1:
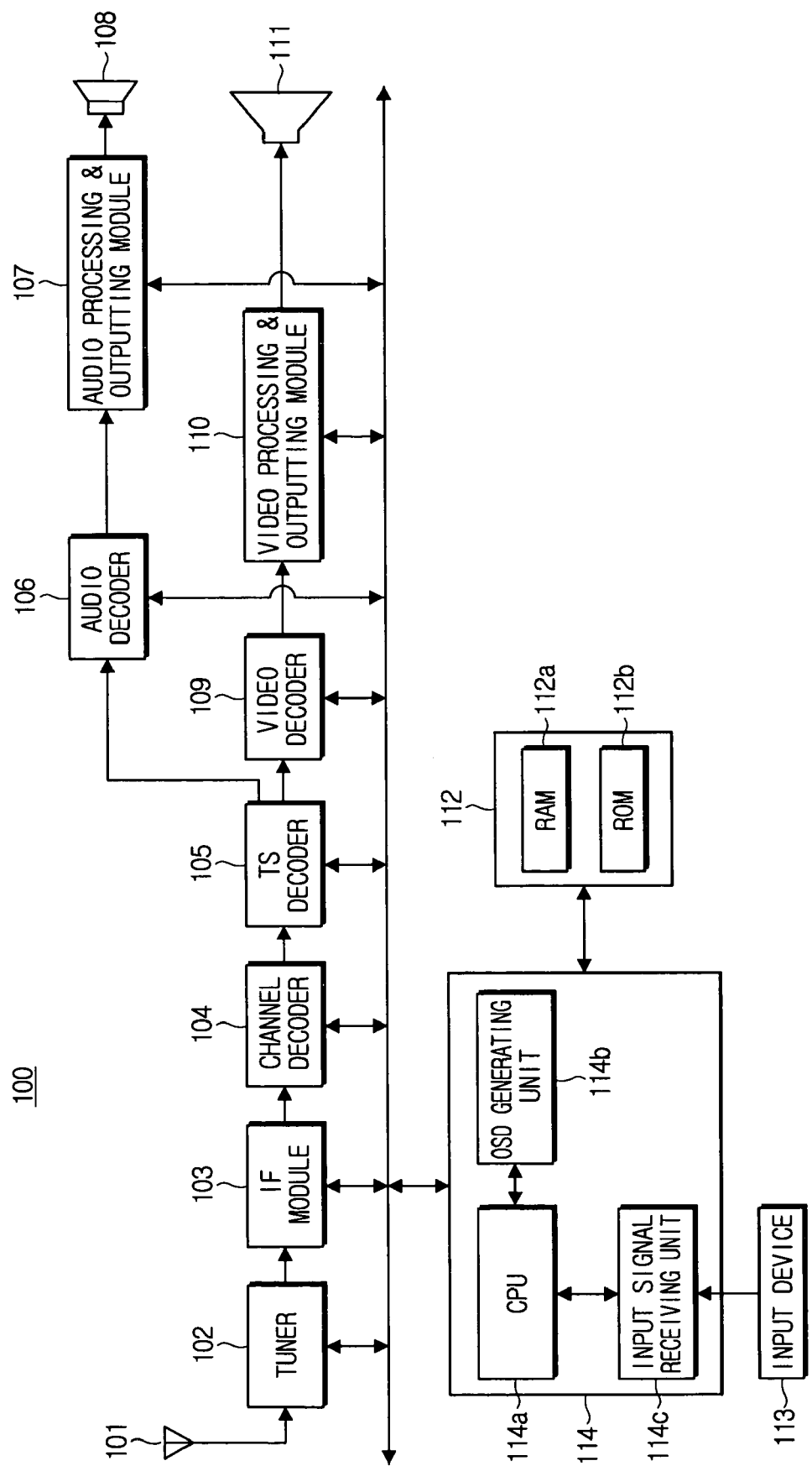
FIG. 1 is a block diagram of a TV set having an OSD apparatus in accordance with an exemplary embodiment of the present invention.

Exemplary embodiments of the present invention will be described in greater detail with reference to the accompanying drawings.

In the following description, same drawing reference numerals are used for the same elements even in different drawings. Well-known functions or constructions are not described in detail since they would obscure the invention in unnecessary detail.

An OSD apparatus and a method for displaying menu items in the OSD apparatus, which are suggested in the present invention, can be applied to video devices, such as TV sets, VCRs, ATMs, computers and the like. Hereinafter, the technology of the present invention will be described with respect to a TV set.

FIG. 1 is a block diagram of a TV set having an OSD apparatus in accordance with an exemplary embodiment of the present invention.

Referring to FIG. 1, the TV set 100 of the present invention includes an antenna 101, a tuner 102, an Intermediate Frequency (IF) module 103, a channel decoder 104, a transport stream (TS) decoder 105, an audio decoder 106, an audio processing and outputting module 107, a speaker 108, a video decoder 109, a video processing and outputting module 110, a screen 111, a memory module 112, an input device 113, and a controller 114.

In FIG. 1, the memory module 112 includes a Random Access Memory (RAM) 112a and a Read Only Memory (ROM) 112b. The controller 114 includes a Central Processing Unit (CPU) 114a, an OSD generating unit 114b, and an input signal receiving unit 114c. In FIG. 1, the screen 111, the memory module 112, the input device 113, and the controller 114 are combined and called an OSD apparatus.

Hereinafter, the operation of the TV set shown in FIG. 1 will be described. The tuner 102 tunes to a channel by inputting TV broadcasting signals that are received through the antenna 101, and outputs IF signals under the control of the CPU 114a.

The IF module 103 converts the IF signals outputted form the tuner 102 into baseband signals.

The channel decoder 104 performs channel decoding on the baseband signals outputted from the IF module 103, thereby producing data bit streams. When an external device (not shown) such as a camera or a VCR is connected to the TV set 100, data bit streams for the video signals inputted from the external device can be produced.

The TS decoder 105 separates audio data and video data from the data bit streams produced by the channel decoder 104.

The audio decoder 106 receives audio data from the data separation in the TS decoder 105 and performs decoding in accordance with the Moving Picture Experts Group (MPEG) specification or the Dolby AC-3 specification.

The audio processing and outputting module 107 receives and processes the decoded audio data from the audio decoder 106 and outputs the data through the speaker 108.

Meanwhile, the video decoder 109 receives the video data from the data separation in the TS decoder 105 and performs decoding in accordance with the MPEG specification.

The video processing and outputting module 110 receives the decoded video data from the video decoder 109, transforms and processes the received video data into a format of data that can be displayed, and displays the data on the screen 111. Also, it is possible to form a combined video by combining the video data decoded in the video decoder 109 with the OSD data generated in OSD generating unit 114b of the controller 114, and to display the combined video on the screen 111. Herein, the OSD data is used for the controller 114 to display various information on the screen 111 in the form of graphics or text.

The input device 113, which is a device such as a control panel or a remote control for a TV set, generates signals according to an input condition inputted by the user. Generally, the control panel or the remote control is provided with function buttons and generates signals as the user presses the buttons. For example, when an input signal for changing a channel is inputted, the CPU 114a of the controller 114 tunes high frequency signals from the antenna 101 by adjusting the tuner 102 and receives corresponding TV broadcasting signals.

Receiving the input signals inputted by the user from the input device 113, the input signal receiving unit 114c of the controller 114 sends out the input signals to the CPU 114a. The CPU 114a executes a corresponding program stored in the ROM 112b of the memory module 112 according to the input signals.

The memory module 112 includes the ROM 112b, which stores a program for operating the controller 114, and the RAM 112a, which temporarily stores data based on the operation of the controller 114. Preferably, the memory module 112 can further include an Electrically Erasable and Programmable ROM (EEPROM) to store various reference data.

Hereafter, an exemplary OSD apparatus of the present invention will be described in detail with reference to FIG. 1 and FIGS. 4 to 7.

First, the memory module 112 stores data for displaying a main menu region 400, a help information region 500, and a sub-menu region 700, and it stores data for first menu items 410, 420, 430, 440 and 450 included in the main menu region 400 and data for icons 411, 421, 431, 441 and 451 for providing information on the first menu items and for texts 412, 422, 432, 442 and 452. Herein, the data for the icons of the first menu items include data for an animation effect, and the data for the texts include data for increasing or decreasing the luminance of the texts. Further, the data for the texts may include data for increasing or decreasing the luminance of the circumference of the texts. Likewise, it is also possible for the data for the icons of the first menu items to include data for increasing or decreasing the luminance of numbers or signs, other than the texts, or the luminance of the circumference of numbers or signs. The memory module 112 also stores data for second menu items that correspond to sub-menu items of the first menu items, and stores a system program for operating the controller 114. The memory module 112 also stores data for providing help information on the first menu items and, although not illustrated in the drawings of the present embodiment, it can store data for help information on the second menu items as well. The memory module 112 includes data for the second menu items of the sub-menu region 700. In particular, the memory module 112 stores data for respective frames of the main menu region 400, the help information region 500, and the sub-menu region 700. In each frame, corresponding menu items and help information are positioned.

Figure 5:
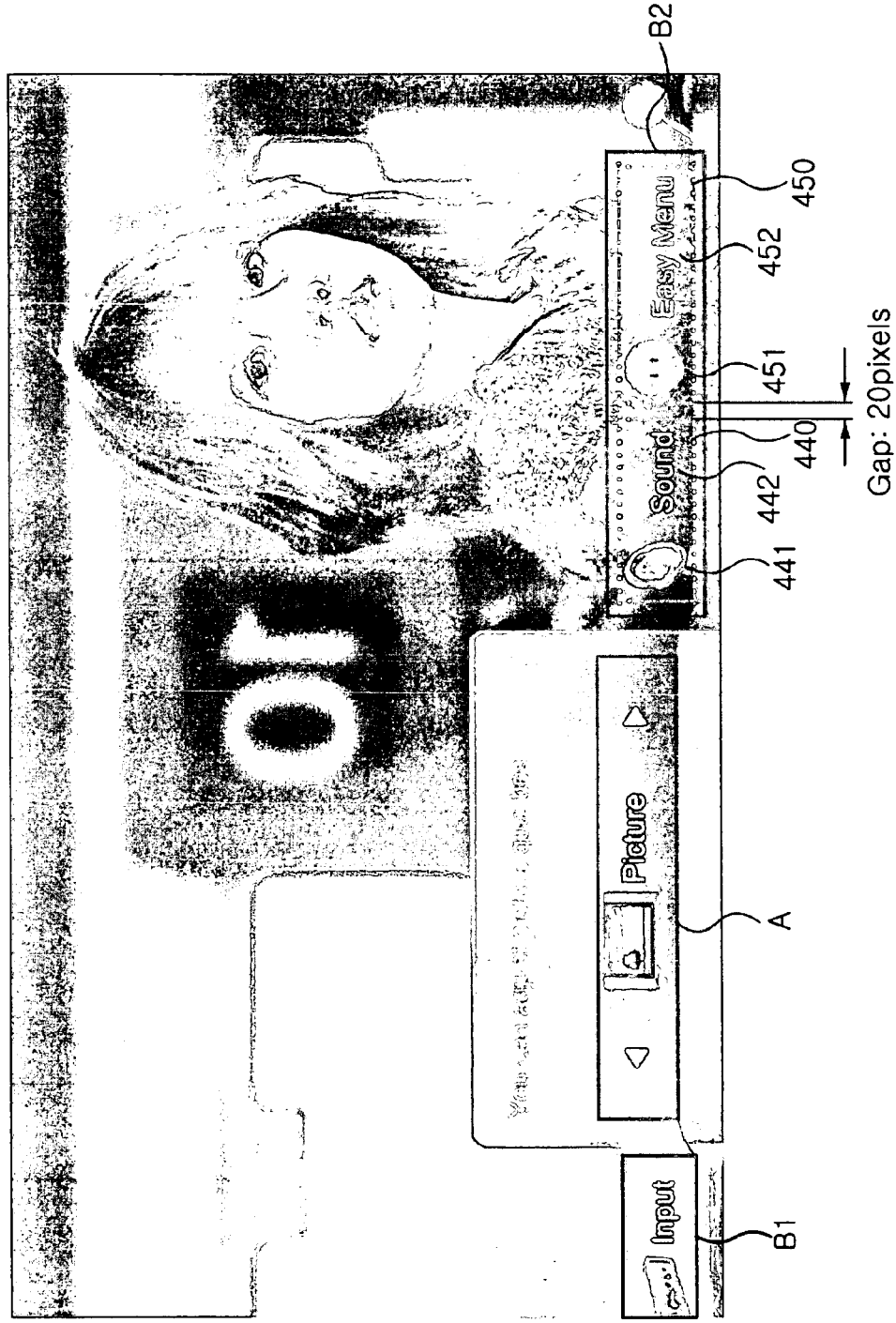

The main menu region 400, i.e., data stored in the memory module 112, will be described more in detail with reference to FIG. 5. The main menu region 400 can be divided into three smaller regions: a selection region (A), a non-selection region 1 (B1), and a non-selection region 2 (B2). The selection region A and the non-selection regions 1 and 2 (B1 and B2) may be displayed in a continuous row. The selection region A and the non-selection regions 1 and 2 (B1 and B2) may have different heights. The selection region (A) may be displayed higher than the non-selection regions 1 and 2 (B1 and B2), with respect to the bottom part of the screen 111. Also, the selection region (A) may occupy more than a third of the main menu region 400, and may occupy a wider region than at least one of the non-selection regions 1 and 2 (B1 and B2). Meanwhile, the first menu items of the main menu region 400 may be arranged horizontally, and one of the first menu items may be positioned in the selection region (A) while at least one of the first menu items may be positioned in the non-selection regions 1 and 2 (B1 and B2). Herein, when there are a plurality of first menu items in the non-selection regions 1 and 2 (B1 and B2), the gap between the first menu items may be 20 pixels. A non-selection region positioned at least one side of the selection region (A) may be opaque so as to be easily distinguished from the selection region (A).

The screen 111, which is a display apparatus, shows the menu items for on screen display in the form of graphics or texts. Herein, a Liquid Crystal Display (LCD), a Cathode Ray Tube (CRT), or another screen as would be understood by one of skill in the art can be used as the screen 111.

The input device 113 generates a cursor on the screen 111, moves the cursor between menu items displayed on the screen, and selects desired menu items.

The controller 114 displays the main menu region 400 and the help information region 500 in a part of a background region 600 by using the system program stored in the memory module 112 based on the signals inputted from the input device 113. The main menu region 400 and the help information region 500 may overlap with and be translucently displayed on the background region 600. The help information region 500 may overlap with and be translucently displayed on a part of the main menu region 400 and on a part of the background region 600. The help information region 500 can be controlled not to be displayed according to a setup by the user. The controller 114 can control the overlap between the help information region 500 and the main menu region 400 to be transparent. Also, the controller 114 can rotate the first menu items horizontally according to move signals for selecting a first menu item from the input device 113. When a first menu item is selected, the sub-menu region 700 is displayed on part of the background region 600 to display the second menu items, which are sub-menu items of each first menu item. Likewise, the sub-menu region 700 may overlap with the background region 600 and be displayed translucently. Herein, when any one of the first menu items is selected upon receipt of a signal transmitted from the input device 113, the controller 114 fades out the entire help information region 500, or causes part of it to disappear, and fades in the second menu items for the selected first menu item. When any one of the first menu items comes in the selection region (A) of the main menu region 400 upon receipt of a signal from the input device 113 and stays for more than a predetermined time, the controller 114 performs control to give an icon corresponding to the first menu item an animation effect and increase the luminance of texts. The predetermined time may be 0.5 second. Alternately, the controller 114 can perform control to increase the luminance of the circumference of texts. Also, it can perform control to increase and decrease the luminance of the texts or the circumference of the texts repeatedly to thereby give a blinking effect.

Figure 2:
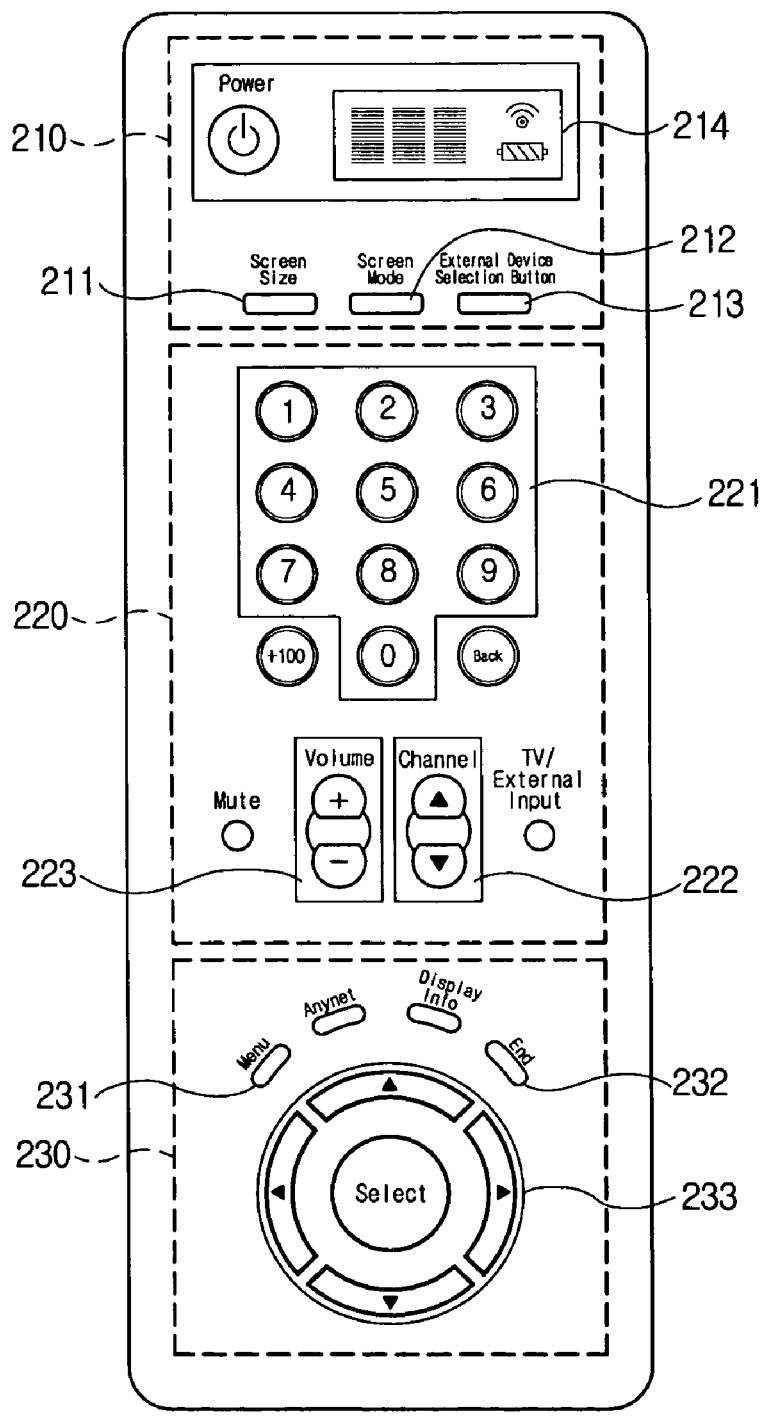
FIG. 2 is a plane view showing a remote control, which is an example of an input device of FIG. 1.

Hereafter, the remote control 200, an example of the input device 113, will be described with reference to FIG. 2. FIG. 2 is a plane view of a remote control in accordance with an embodiment of the present invention. The remote control 200 can be largely divided into three parts.

A first part 210 displays the initial setup state and the current setup state of the TV set 100 or the remote control 200. The buttons of the first part 210 include a screen size button 211 for controlling the size of display screen, a screen mode button 212 for selecting one of several screen modes which are formed according to image quality or the degree of definition according to circumstance, and an external device selection button 213 for operating an external device, such as a VCR or a Digital Video Disc (DVD), other than the TV set 100. Also, the first part 210 can include an LCD unit 214 to show the user the current setup state. A second part 220 includes buttons for setting up basic functions of the TV set 100. It includes number buttons 221 and channel selection buttons 222 for selecting or changing a channel, and volume buttons 223 for controlling the volume of the speaker 108.

The third part 230 includes buttons for displaying and selecting menu items. A menu button 231 displays menu items for on screen display on the screen 111 where an image is shown. When there are no menu items shown on the screen 111, the selection of the menu button 231 displays the main menu region 400 including the first menu items. If the menu items are already displayed on the screen 111, the selection of the menu button generally plays the role of a back button for going back to the previous screen state. For example, when the menu button 231 is pressed while the sub-menu region 700 including the sub-menu items are displayed, the screen goes back to the previous screen, i.e., the main menu region 400 where each main menu item includes the first menu items. When the menu button 231 is pressed while the main menu region 400 is displayed, all the menu items disappear.

When menu items are displayed, the selection of an end button 231 of the third part 230 removes all the menu items from the screen, whether the menu items are of the main menu region 400 or the sub-menu region 700, and displays a normal screen.

Selection of the move and selection buttons 233 of the third part 230 generate a cursor and move the cursor up, down, right, and left between the menu items displayed on the screen so that the user can select a desired menu item, and designates or adjusts a function value for the selected menu item.

In the present embodiment, the remote control is used as the input device 113. However, a control panel attached to the TV set 100 in an integrated form can be used. Also, a keyboard or a mouse connected to the TV set 100 through wire or wirelessly can be used as the input device 113.

Figure 3:
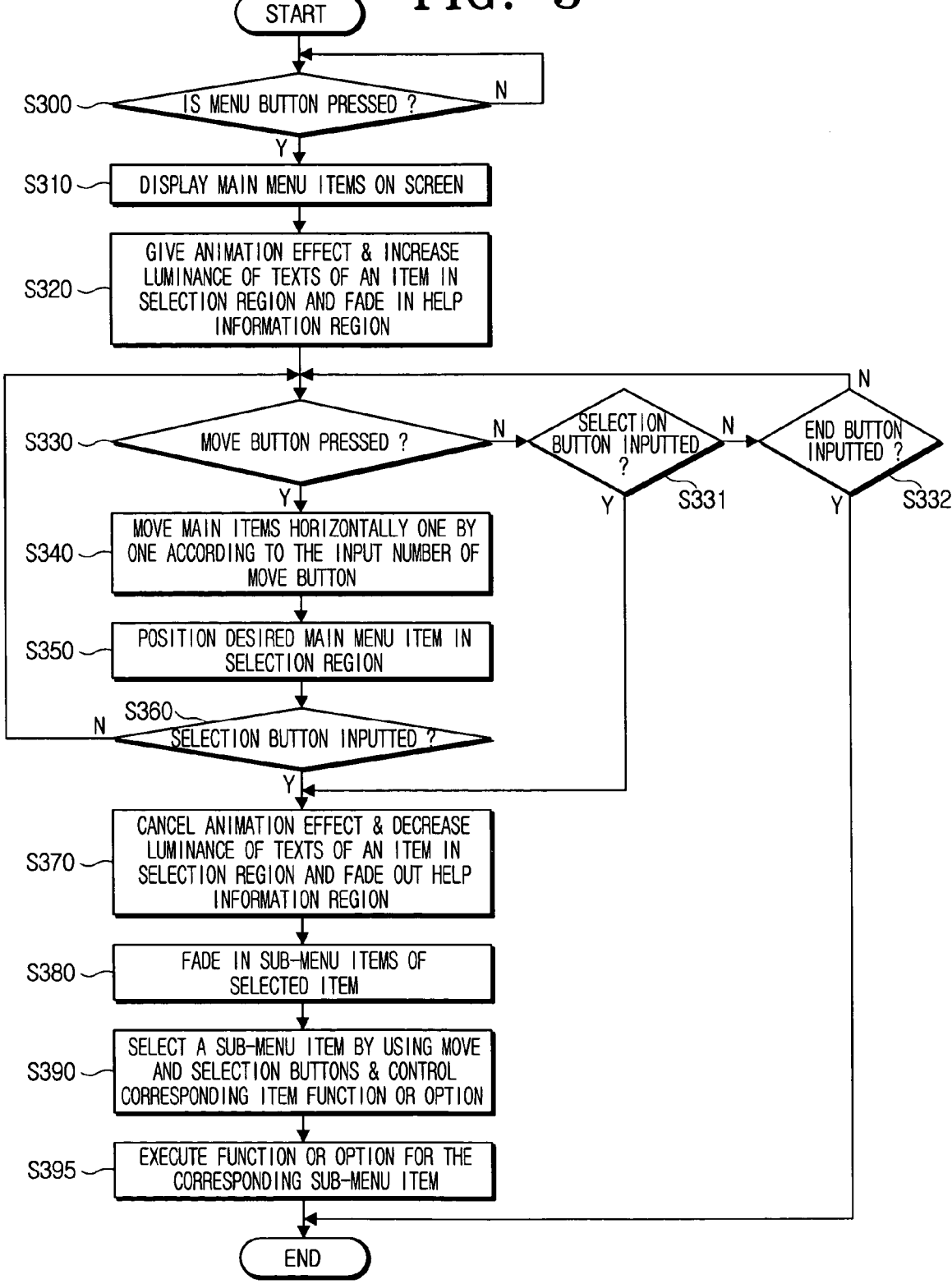
FIG. 3 is a flowchart of a menu display process in accordance with an exemplary embodiment of the present invention.
Figure 4:
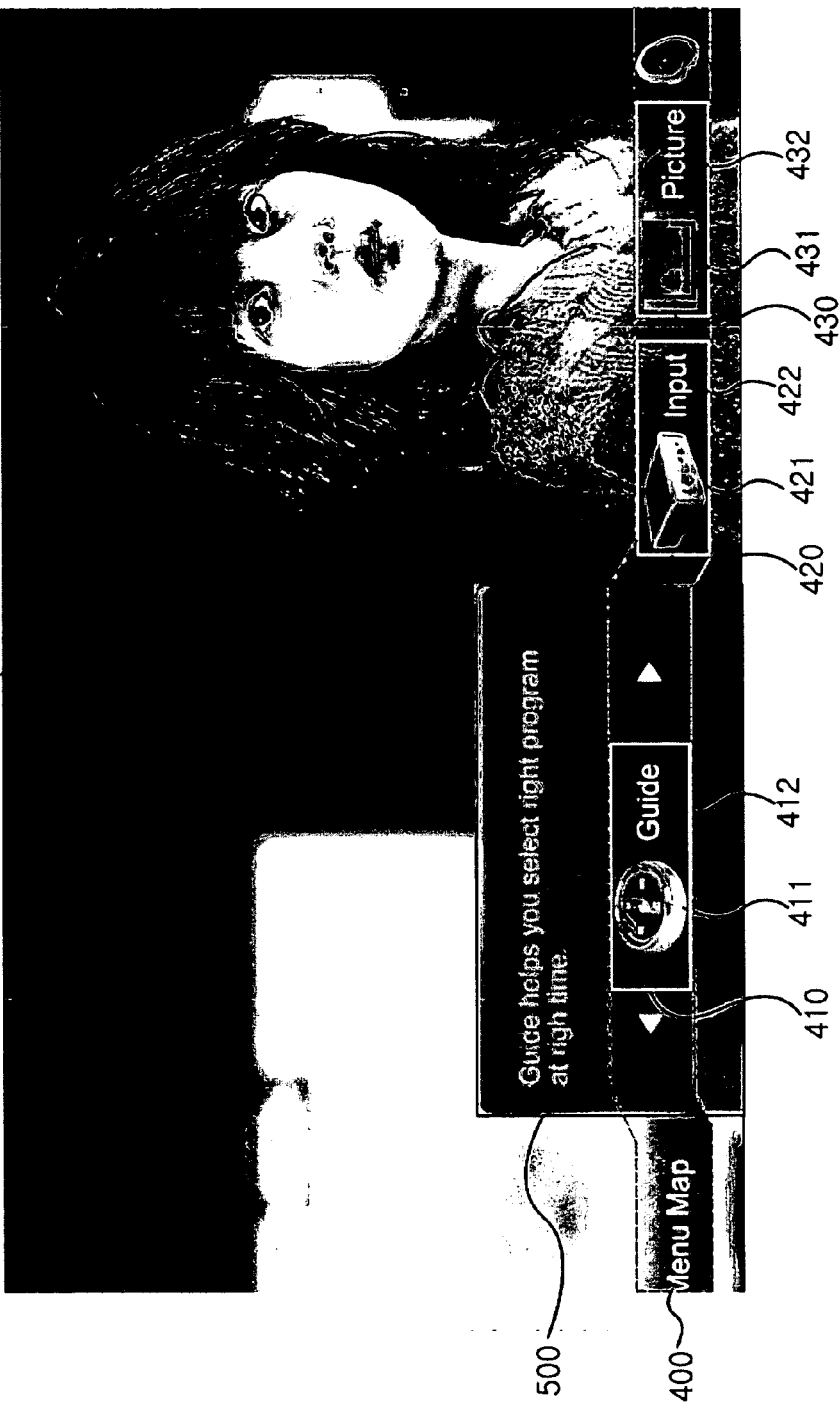
FIGS. 4 to 7 show exemplary menus displayed on a screen in accordance with exemplary embodiments of the present invention.

Hereafter, a method for displaying menu items suggested in an exemplary embodiment of the present invention will be described with reference to FIG. 3.

Figure 6A:
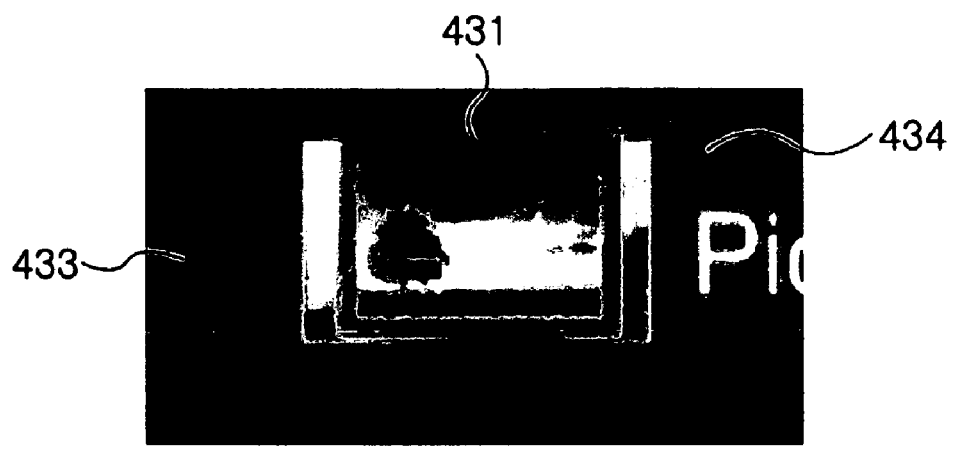
Figure 6B:
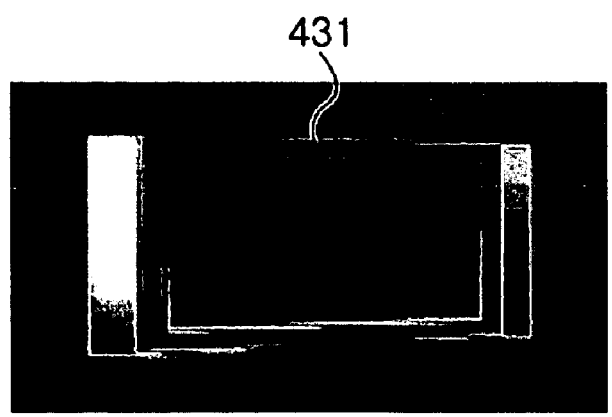
Figure 7:
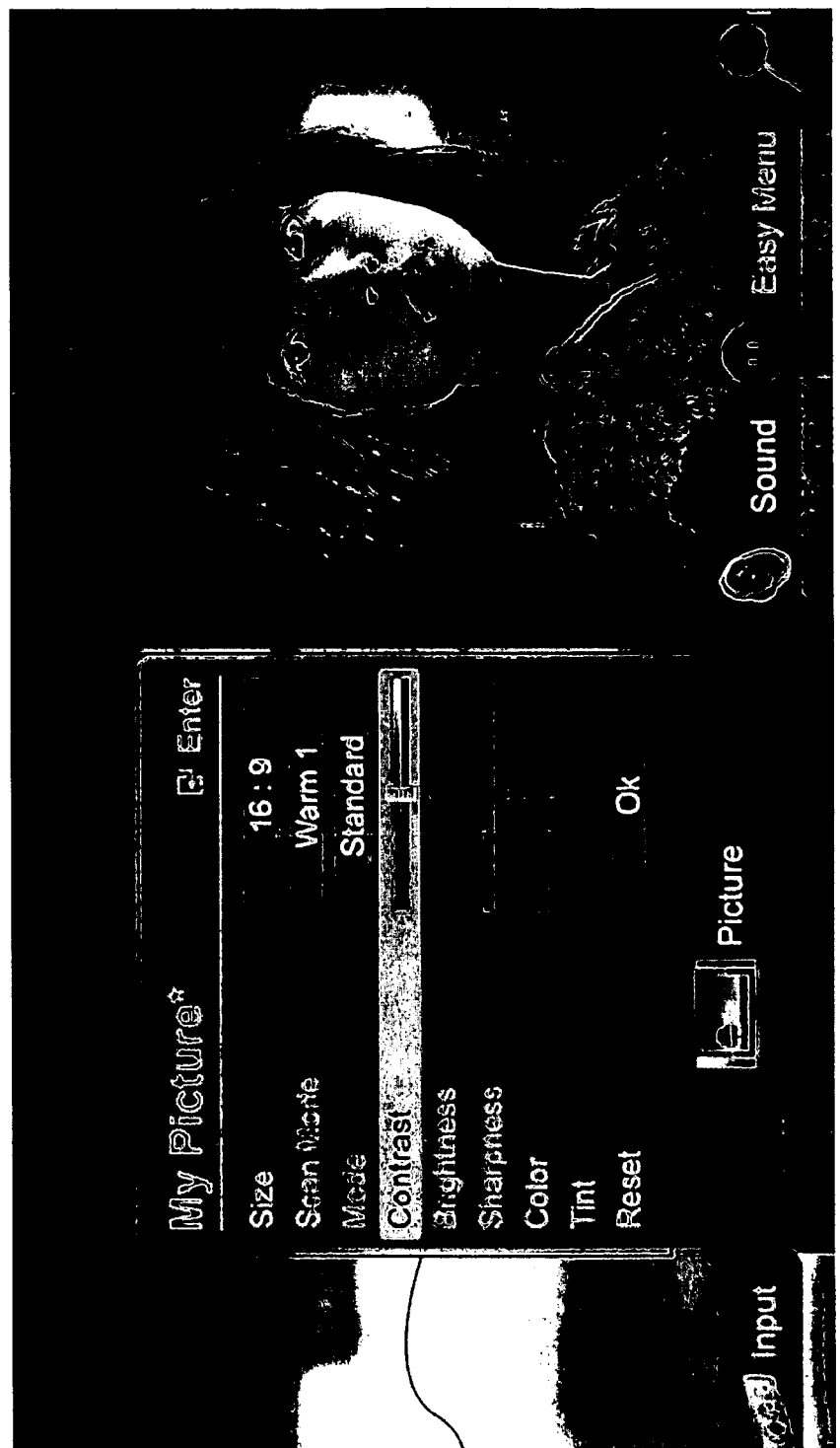

First, in operation S300, the controller 114 of the TV set 100 determines whether the menu button 231 is pressed on the input device 113. Herein, the menu button 231 is pressed when the screen 111 is in the normal state, i.e., normal screen, or in the initial state, i.e., initial screen. The normal screen means the state of the screen displaying no menu items for on screen display. Subsequently, in operation S310, when the controller 114 determines that the menu button 231 is pressed, it displays the first menu items of the main menu region 400, i.e., the main menu items on the screen 111. After a predetermined time, icons of the main menu items positioned in the selection region (A) of the main menu region 400 among the main menu items are controlled to have an animation effect and the texts are controlled to have an increased level of luminance. For example, as illustrated in FIGS. 4 to 6B, when a main menu item 'Picture' 430 is positioned in the selection region (A), the icon 'Picture' 431 comes to have the animation effect after the predetermined time and the luminance of the text 'Picture' is increased. Herein, the animation effect applied to the icon 'Picture' 431 may be a periodic generation of circles 433 and 434 around the icon 431 or a change in the phase of the icon 431 for giving the sense of distance, as shown in FIG. 6B, or other animations as would be understood by one of skill in the art. The animation effect applied to the icons of the main menu items can be different according to each main menu item. If help information is being displayed, the help information region 500 is overlapped with and displayed over the background region 600 and the main menu region 400. In operations S330 to S332, it is determined whether the move and selection buttons 233 are pressed in the remote control 200 or whether the end button 232 is pressed. If a move button is pressed, in operation S340, the main menu items move horizontally to the left or right one by one according to the number of the button pressed. In operation S350, it is determined whether a main menu item to be selected is positioned in the selection region (A) and, in operation S360, it is determined whether the selection button is inputted.

If the selection button is inputted, in operation S370, the animation effect of the icon corresponding to the main menu item positioned in the selection region (A) is cancelled and the luminance of the texts is reduced. If the help information region 500 is overlapped with the background region 600 and the main menu region 400 and displayed, it fades out in the operation S370. Almost simultaneously, in operation S380, the second menu region 700 including the sub-menu items of the selected first menu item fades in and is displayed. Subsequently, in operation S390, the user selects one of the sub-menu items and adjusts the function or option of the selected sub-menu item by using the move and selection buttons 233 and, in operation S395, the controller 114 performs control to execute the function or option of the adjusted item.

In the operation S330, although the selection button is pressed in the operation S331 without any input of the move button, the same processes are carried out.

If the end button 232 is inputted in operation S332 without any input of the move or selection button 233 in the operation S330, the menu items displayed on the screen are removed and terminated. In short, a function for displaying the normal screen is executed. Thus, although menu items are displayed, the end button 231 removes all the menu items, no matter what menu items are displayed in the main menu region 400 or of the sub-menu region 700.

As described above, according to the OSD apparatus and the menu display method for the OSD apparatus suggested in the present invention, the user can select a desired menu item easily because a characteristic icon and text is provided for each of the menu items. Also, the technology of the present invention can increase the degree of attention a user pays to a menu item desired to be selected by providing an animation effect according to the characteristics of each icon and by increasing the level of luminance for text in a specific menu region.

In addition, the present invention facilitates user set up and control of the functions or options of a video device by providing help information for each menu item.

The exemplary embodiments of the present invention displays a selection region and a non-selection region of the main menu differently, so that the user can recognize the selection region easily and can conveniently set up the function or option for a corresponding menu item in the selection region.

According to the exemplary embodiments of the present invention, since the menu region and menu items displayed on the screen are displayed translucently, the user can watch the video displayed on the screen while the user sets up the function or option of the selected menu item.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An on screen display (OSD) apparatus comprising:
a memory module which stores data for a first region, and which stores a system program, wherein the data for the first region comprises a plurality of first menu items;
a screen which displays the first region;
an input device which generates signals for displaying the first region on the screen; and
a controller which divides the first region into a first sub-region and a second sub-region and displays the first sub-region and the second sub-region at different heights on the screen, wherein, if at least one first menu item of the plurality of first menu items is displayed in the first sub-region, the controller displays at least one sub-menu item for the at least one first menu item displayed in the first sub-region simultaneously with at least one more first menu item of the plurality of first menu items, on the screen.

2. The OSD apparatus as recited in claim 1, wherein, if the at least one first menu item of the plurality of first menu items is displayed in the first sub-region, the controller displays help information for the at least one first menu item on the screen.

3. The OSD apparatus as recited in claim 1, wherein the controller moves the first menu items horizontally on the screen upon receipt of move signals from an input device.

4. The OSD apparatus as recited in claim 1, wherein, if the at least one first menu item of the plurality of first menu items is displayed in the first sub-region, the controller animates the at least one first menu item and displays the at least one first menu item which is animated on the screen.

5. The OSD apparatus as recited in claim 4, wherein the controller animates the at least one first menu item after the at least one of the first menu item is displayed in the first sub-region for a predetermined time.

6. The OSD apparatus as recited in claim 1, wherein the controller divides the first region into the first sub-region and the second sub-region by using the system program upon receipt of signals from the input device.

7. The OSD apparatus as recited in claim 1, wherein the input device is a remote control.

8. The OSD apparatus as recited in claim 1, wherein the input device is a control panel.

9. A method for displaying a menu in an on screen display (OSD) apparatus, comprising:
storing a system program and data for a first region, wherein the data for the first region includes a plurality of first menu items;
generating signals for displaying the first region on a screen;
receiving signals from an input device;
dividing the first region into a first sub-region and a second sub-region, by using the system program, upon receipt of the signals from the input device, and displaying the first sub-region and the second sub-region at different heights on a screen, and displaying simultaneously at least one sub-menu item for at least one first menu item of the plurality of first menu items and at least one more first menu item of the plurality of first menu items, on the screen, if the at least one first menu item of the plurality of first menu items is displayed in the first sub-region.

10. The method as recited in claim 9, further comprising:
if the at least one the-first menu item of the plurality of first menu items is displayed in the first sub-region, displaying help information for the at least one first menu item on the screen.

11. The method as recited in claim 9, further comprising:
moving the first menu items horizontally on the screen upon receipt of move signals for moving the menu items, after the first region is displayed.

12. The method as recited in claim 9, farther comprising a step of:
if the at least one first menu item of the plurality of first menu items is displayed in the first sub-region, animating the at least one first menu item and displaying the animated first menu item on the screen.

13. The method as recited in claim 9, wherein the input device is a remote control.

14. The method as recited in claim 9, wherein the input device is a control panel.

15. The method as recited in claim 9, wherein the at least one first menu item is animated after the at last one first menu is displayed in the first sub-region for a predetermined time.

* * * * *